US012590981B2

(12) United States Patent
Minami et al.

(10) Patent No.: US 12,590,981 B2
(45) Date of Patent: Mar. 31, 2026

(54) AUTOMATIC ANALYZER

(71) Applicant: Hitachi High-Tech Corporation, Tokyo (JP)

(72) Inventors: Noritaka Minami, Tokyo (JP); Yoichiro Suzuki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 523 days.

(21) Appl. No.: 18/025,732

(22) PCT Filed: Feb. 26, 2021

(86) PCT No.: PCT/JP2021/007440
§ 371 (c)(1),
(2) Date: Mar. 10, 2023

(87) PCT Pub. No.: WO2022/070459
PCT Pub. Date: Apr. 7, 2022

(65) Prior Publication Data
US 2023/0349941 A1 Nov. 2, 2023

(30) Foreign Application Priority Data
Sep. 29, 2020 (JP) ................................. 2020-162911

(51) Int. Cl.
*G01N 35/10* (2006.01)
*G01N 35/00* (2006.01)

(52) U.S. Cl.
CPC ... *G01N 35/1011* (2013.01); *G01N 35/00732* (2013.01); *G01N 2035/00811* (2013.01); *G01N 2035/1025* (2013.01)

(58) Field of Classification Search
None
See application file for complete search history.

(56) References Cited

U.S. PATENT DOCUMENTS 8,430,321 B2 * 4/2013 Tokunaga ........ G01N 35/00712
235/487
2002/0108857 A1 8/2002 Paschetto et al.
(Continued)

FOREIGN PATENT DOCUMENTS

JP 2008-190959 A 8/2008
JP 2012-7998 A 1/2012
(Continued)

OTHER PUBLICATIONS

Extended European Search Report issued in European Application No. 21874767.3 dated Sep. 23, 2024 (10 pages).
(Continued)

*Primary Examiner* — Brian R Gordon
(74) *Attorney, Agent, or Firm* — Crowell & Moring LLP

(57) ABSTRACT

An automatic analyzer includes an installation plate on which a system reagent container is installed, a liquid aspiration unit that aspirates a reagent from the system reagent container, a support unit to which the liquid aspiration unit is coupled and which can be moved between a reagent container exchange position and a reagent aspiration position, and a lift mechanism that allows the support unit to perform a lift operation. The support unit of the liquid aspiration unit is raised to the reagent container exchange position by the lift mechanism when a first condition is satisfied, and the support unit of the liquid aspiration unit is lowered to the reagent aspiration position by the lift mechanism when a second condition is satisfied.

5 Claims, 11 Drawing Sheets

(56) References Cited

U.S. PATENT DOCUMENTS

| | | | | |
|---|---|---|---|---|
| 2007/0251341 A1* | 11/2007 | Balmer | G01N 35/1011 | |
| | | | | 74/49 |
| 2008/0050279 A1* | 2/2008 | Fujita | G01N 35/026 | |
| | | | | 422/63 |
| 2009/0223012 A1 | 9/2009 | Hibe et al. | | |
| 2010/0001876 A1* | 1/2010 | Sasaki | G01N 35/00732 | |
| | | | | 709/204 |
| 2011/0223682 A1* | 9/2011 | Wakamiya | G01N 35/00732 | |
| | | | | 422/68.1 |
| 2011/0229374 A1* | 9/2011 | Tokunaga | G01N 35/00732 | |
| | | | | 422/68.1 |
| 2011/0244557 A1 | 10/2011 | Hamada | | |
| 2011/0318845 A1 | 12/2011 | Kurono et al. | | |
| 2012/0028343 A1* | 2/2012 | Kitagawa | G01N 35/00722 | |
| | | | | 422/561 |
| 2012/0045366 A1* | 2/2012 | Katsumi | G01N 35/1011 | |
| | | | | 422/67 |
| 2012/0141326 A1* | 6/2012 | Kuwano | G01N 35/0092 | |
| | | | | 422/67 |
| 2012/0222773 A1* | 9/2012 | Yamato | G01N 35/10 | |
| | | | | 422/68.1 |
| 2013/0143257 A1* | 6/2013 | Small | G01N 35/1009 | |
| | | | | 435/29 |
| 2015/0260747 A1* | 9/2015 | Samsoondar | G01N 35/00871 | |
| | | | | 422/511 |
| 2015/0355208 A1* | 12/2015 | German | G01N 35/021 | |
| | | | | 422/65 |
| 2016/0045918 A1* | 2/2016 | Lapham | G01N 35/028 | |
| | | | | 506/40 |
| 2017/0176482 A1* | 6/2017 | Fujii | G01N 33/86 | |
| 2018/0282788 A1* | 10/2018 | Opalsky | B01L 3/565 | |
| 2018/0290143 A1* | 10/2018 | Cofano | G01N 35/1011 | |
| 2019/0219604 A1 | 7/2019 | Takahashi et al. | | |
| 2020/0104031 A1* | 4/2020 | Moriura | G06F 3/0484 | |
| 2020/0110103 A1* | 4/2020 | Gorman | B04B 13/00 | |
| 2020/0241025 A1* | 7/2020 | Asakura | G01N 35/1002 | |
| 2020/0319219 A1* | 10/2020 | Vansickler | G01N 35/00732 | |
| 2021/0025909 A1 | 1/2021 | Miyakawa et al. | | |
| 2021/0165009 A1 | 6/2021 | Miyakawa et al. | | |
| 2021/0285977 A1* | 9/2021 | Tu | G16H 10/40 | |
| 2021/0311082 A1* | 10/2021 | Tesluk | G01N 35/1011 | |
| 2022/0065886 A1* | 3/2022 | Matsuoka | G01N 35/1079 | |
| 2022/0120773 A1* | 4/2022 | Yamamura | G01N 35/1002 | |
| 2022/0341960 A1* | 10/2022 | Ishiguro | G01N 35/1011 | |
| 2023/0003755 A1* | 1/2023 | Sattler | G01N 35/1011 | |
| 2023/0010798 A1* | 1/2023 | Ota | G01N 35/0092 | |
| 2023/0204609 A1* | 6/2023 | Horiuchi | G01N 35/1009 | |
| | | | | 702/184 |
| 2023/0204612 A1* | 6/2023 | Suzuki | G01N 35/026 | |
| | | | | 422/65 |
| 2024/0192244 A1* | 6/2024 | Takahashi | G01N 35/1002 | |
| 2024/0310401 A1* | 9/2024 | Tajima | G01N 35/026 | |
| 2025/0264487 A1* | 8/2025 | Gorman | G01N 35/0092 | |

FOREIGN PATENT DOCUMENTS

| | | |
|---|---|---|
| WO | WO 2008/035777 A1 | 3/2008 |
| WO | WO 2009/031503 A1 | 3/2009 |
| WO | WO 2018/055929 A1 | 3/2018 |
| WO | WO 2019/198400 A1 | 10/2019 |
| WO | WO 2019/198493 A1 | 10/2019 |

OTHER PUBLICATIONS

International Search Report (PCT/ISA/210) issued in PCT Application No. PCT/JP2021/007440 dated May 11, 2021 with English translation (seven (7) pages).

Japanese-language Written Opinion (PCT/ISA/237) issued in PCT Application No. PCT/JP2021/007440 dated May 11, 2021 (four (4) pages).

Japanese-language International Preliminary Report on Patentability (PCT/IPEA/416 & PCT/IPEA/409) issued in PCT Application No. PCT/JP2021/007440 dated Aug. 29, 2022, including Annexes (eight (8( pages).

* cited by examiner

FIG. 4

(a) NORMAL STATE (b) LOCK STATE (c) LOCK RELEASE STATE

| SOLENOID 511 | OFF |
| --- | --- |
| LENGTH OF SPRING 504 | < NATURAL LENGTH |

| SOLENOID 511 | OFF |
| --- | --- |
| LENGTH OF SPRING 504 | ≒ NATURAL LENGTH |

| SOLENOID 511 | ON → OFF |
| --- | --- |
| LENGTH OF SPRING 504 | < NATURAL LENGTH |

| LOCK RELEASE STATE | |
|---|---|
| SOLENOID | ON |
| LENGTH OF SPRING | < NATURAL LENGTH |

| LOCK STATE (UPPER-LIMIT POINT) | |
|---|---|
| SOLENOID | OFF |
| LENGTH OF SPRING | ≒ NATURAL LENGTH |

AUTOMATIC ANALYZER

TECHNICAL FIELD

The present invention relates to an automatic analyzer for performing a qualitative/quantitative analysis of a biological specimen such as blood and urine.

BACKGROUND ART

An automatic analyzer performs a qualitative and quantitative analysis on a certain component included in a biological sample, such as blood or urine. A general operation includes dispensing a sample from a sample container into a reaction container using a dedicated nozzle, and then dispensing a reagent from a reagent container into the reaction container using a dedicated nozzle, and after stirring it, inducing a reaction for a certain period of time, and calculating a concentration of a target item from information such as an absorbance and an amount of luminescence obtained from a reaction liquid. In such an automatic analyzer, in order to perform an accurate measurement, it is necessary to clean a container for reacting a specimen and a reagent and a nozzle for aspirating the specimen and the reagent with a detergent at appropriate timing.

In the automatic analyzer, a system reagent such as an alkaline detergent or an acidic detergent is mainly used as consumables, and the exchange work thereof is generally manually performed by an operator. The automatic analyzer often includes a dedicated aspiration nozzle for each of these reagent containers, and it is common that the dedicated aspiration nozzle and the reagent are always in contact with each other while the system reagent is placed on the device. In the exchange work, a sequence of operations includes separating this dedicated nozzle from the container, exchanging the reagent containers, and placing the dedicated nozzle again in each of the reagent containers.

In recent years, the demand for specimen inspections has increased and the above-described automatic analyzer is often used. While the demand is increasing, many medical institutions and inspection institutions are striving to improve the inspection quality and reduce the cost, and it is required to efficiently perform the operation with less labor. In this situation, the above-described reagent container exchange work is considered to be a burden on operators and a cause of errors because of the high maintenance frequency.

Patent Literature 1 discloses a specimen analyzer having, as a method for preventing the contamination of the reagent, a function of notifying the operator a reagent that is a wrong reagent, a reagent whose residual amount is insufficient, or a reagent that is expired by attaching an information storage medium such as an RFID to a reagent container and providing, in the analyzer, an information reading unit that reads information in the information storage medium. Furthermore, Patent Literature 1 includes a mechanism for controlling an aspiration nozzle to be locked regardless of whether the power supply of the device is turned on or off and a control unit for the mechanism, and thus taking a measure to prevent the operator from bringing the dedicated nozzle into contact with a wrong reagent.

CITATION LIST

Patent Literature

Patent Literature 1: WO 2019/198400

SUMMARY OF INVENTION

Technical Problem

According to the analyzer of Patent Literature 1, in the reagent container exchange work, the operations of inserting the nozzle into the reagent container and removing the nozzle from the reagent container are manually performed. If the reagent container exchange work can be performed manually, there is an advantage that the mechanism can be simplified because a driving source is not required. On the other hand, since the nozzle support unit is manually raised and lowered, the nozzle may be touched during the exchange and the contamination of the operator's hand and the device, or between the reagents may occur, or the nozzle may be bent during the exchange. As a result of these, there may be problems that a correct measurement result cannot be obtained, a consumable reagent becomes unusable, and a reagent flow path of the device needs to be rewashed. Therefore, the analyzer is preferred to include a mechanism that allows the operator to raise and lower the nozzle without touching the vicinity of the nozzle during the reagent exchange work.

The present invention has been made in consideration of the above circumstances, and it is an object of the present invention to provide an automatic analyzer to solve the problem that may occur when the operator manually performs the exchange work of detergents or reagents and reduce the work burden on the operator.

Solution to Problem

In order to achieve the above-described object, according to the present invention, there is provided an automatic analyzer including an installation plate on which a system reagent container is installed, a liquid aspiration unit that aspirates a reagent from the system reagent container, a support unit to which the liquid aspiration unit is coupled and which can be moved between a reagent container exchange position and a reagent aspiration position, a lift mechanism that allows the support unit to perform a lift operation, and a control unit that controls the lift mechanism so that the support unit is raised to the reagent container exchange position when a first condition is satisfied and the support unit is lowered to the reagent aspiration position when a second condition is satisfied.

Advantageous Effects of Invention

According to the present invention, the work burden on the operator during the system reagent container exchange work can be reduced.

BRIEF DESCRIPTION OF DRAWINGS

FIG. 4 is a diagram for showing a first configuration example of a lock mechanism and a lock release mechanism according to the first embodiment.

DESCRIPTION OF EMBODIMENTS

Various kinds of embodiments of the present invention will be described according to the drawings. That is, it is an embodiment of an automatic analyzer including an installation plate on which a system reagent container is installed, a liquid aspiration unit that aspirates a reagent from the system reagent container, a support unit to which the liquid aspiration unit is coupled and which can be moved between a reagent container exchange position and a reagent aspiration position, a lift mechanism that allows the support unit to perform a lift operation, and a control unit that controls the lift mechanism so that the support unit is raised to the reagent container exchange position when a first condition is satisfied and the support unit is lowered to the reagent aspiration position when a second condition is satisfied. In the following embodiments, the constituent elements, the element steps, and the like are not necessarily essential, unless particularly specified or considered to be obviously essential in principle.

Here, the first condition is that a residual liquid amount in the system reagent container installed on the installation plate is equal to or smaller than a specified value, and the second condition is that the contents of the plural system reagent containers installed on the installation plate are normal and are installed at predetermined given positions.

Figure 1:
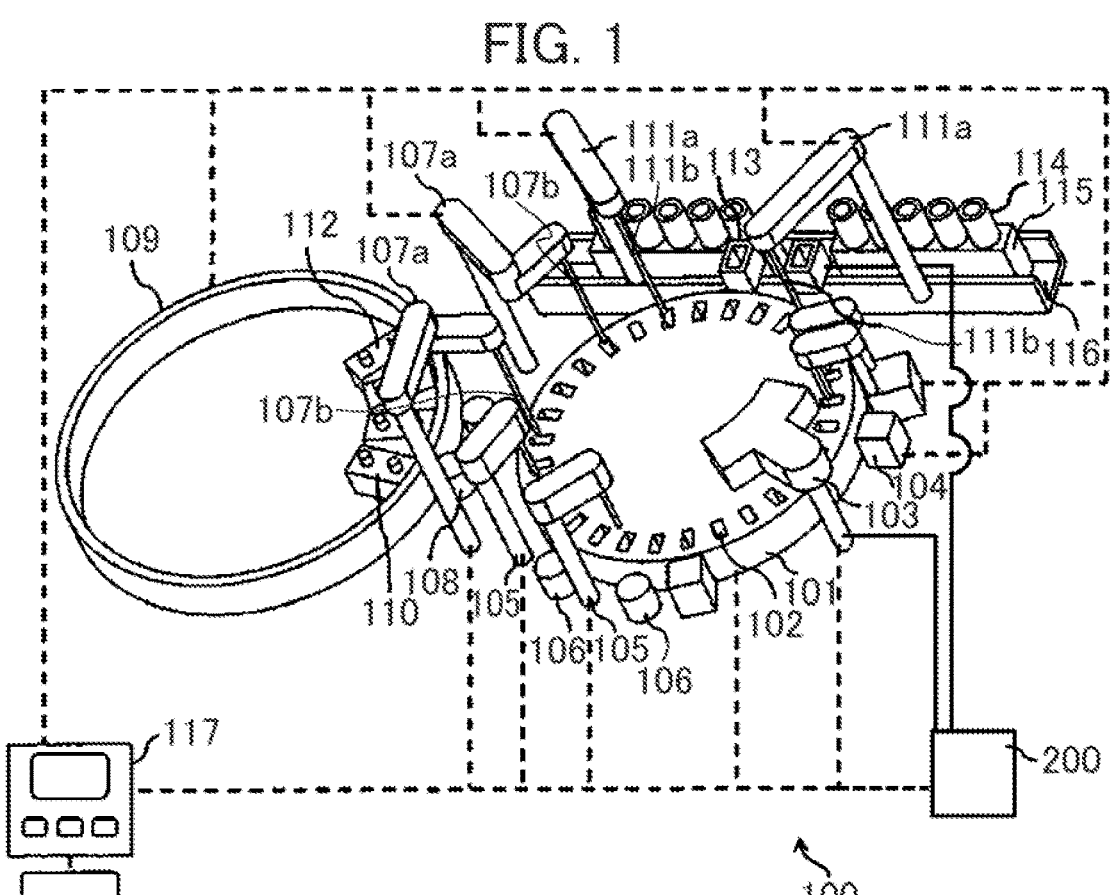
FIG. 1 is an entire outline view of an automatic analyzer according to each embodiment.

FIG. 1 is an entire outline view of the automatic analyzer. An automatic analyzer 100 is a device that measures a reaction solution that has chemically reacted in a reaction container 102 and performs an analysis of the component. This automatic analyzer 100 includes, as a main configuration, a reaction disk 101, a washing mechanism 103, a spectrophotometer 104, stirring mechanisms 105, washing tanks 106, reagent dispensing mechanisms 107a, reagent dispensing probes 107b, reagent dispensing probe washing tanks 108, a reagent disk 109, sample dispensing mechanisms 111a, sample dispensing probes 111b, sample dispensing probe washing tanks 113, a sample conveyance mechanism 116, and an operation portion 117.

Reaction containers 102 are circumferentially disposed on the reaction disk 101. The reaction container 102 contains a mixed solution of a sample and a reagent, and a plurality of the reaction containers 102 are arranged on the reaction disk 101. The sample conveyance mechanism 116 for conveying a sample rack 115 on which sample containers 114 are mounted is disposed near the reaction disk 101.

The sample dispensing mechanisms 111a, which are rotatable and vertically movable, are disposed between the reaction disk 101 and the sample conveyance mechanism 116, and each of the sample dispensing mechanisms 111a includes a sample dispensing probe 111b. The sample dispensing probe 111b moves horizontally and arcuately around a rotational axis and vertically moves so as to dispense a sample from the sample container 114 to the reaction container 102.

The reagent disk 109 is a storage which allows a plurality of reagent bottles 110 in which reagents are contained, a plurality of detergent bottles 112 and the like to be circumferentially placed therein. The reagent disk 109 is kept cold.

The reagent dispensing mechanisms 107a, which are rotatable and vertically movable, are installed between the reaction disk 101 and the reagent disk 109, and each of the reagent dispensing mechanisms 107a includes a reagent dispensing probe 107b. The reagent dispensing probe 107b moves vertically and horizontally. Via the reagent dispensing probes 107b, the reagent dispensing mechanisms 107a dispense the reagent, the detergent, a dilute solution, a pre-treatment reagent and the like aspirated from the reagent bottle 110, the detergent bottle 112, a dilute solution bottle, a pre-treatment reagent bottle and the like to the reaction containers 102.

The washing mechanism 103 to wash the interior of the reaction containers 102, the spectrophotometer 104 for measuring the absorbance of the light passed through the mixed solution in the reaction containers 102, the stirring mechanisms 105 for admixing the sample and the reagent dispensed to the reaction containers 102 and the like are disposed in the circumference of the reaction disk 101.

Further, the washing tank 108 for the reagent dispensing probe 107b is disposed within the moving range of the reagent dispensing mechanism 107a, the washing tank 113 for the sample dispensing probe 111b is disposed within the moving range of the sample dispensing mechanism 111a, and the washing tank 106 for the stirring mechanism 105 is disposed within the moving range of the stirring mechanism 105. When the reaction solution is stirred by the stirring mechanism 105 in a non-contact manner, the washing tank 106 is not necessarily required.

The respective mechanisms are connected to the operation portion 117, and their operations are controlled by the operation portion 117. Thus, the operation portion 117 functions as a control unit, which will be described later. This operation portion 117 is composed of a computer and the like, and controls the operations of the above-described respective mechanisms in the automatic analyzer as well as performs the computation processing to calculate the concentrations of the prescribed components in such liquid samples as blood and urine. The operation portion 117 also plays a role in displaying the result of computation processing and various operations on a screen.

An analytical processing of an inspection sample by the above-described automatic analyzer 100 is executed in the following order. First, the sample container 114 placed on the sample rack 115 is conveyed to a position close to the reaction disk 101 by the sample conveyance mechanism 116, and the sample in the sample container 114 is dispensed to the reaction container 102 on the reaction disk 101 by the sample dispensing probe 111*b* of the sample dispensing mechanism 111*a*. Next, using the reagent dispensing probe 107*b* of the reagent dispensing mechanism 107*a*, a reagent to be used in analysis is dispensed from the reagent bottle 110 on the reagent disk 109 to the reaction container 102 in which the sample has already been dispensed. Subsequently, the mixed solution of the sample and the reagent in the reaction container 102 is stirred by the stirring mechanism 105.

After that, the light emitted from the light source is transmitted through the reaction container 102 containing the mixed solution, and the absorbance of the transmitted light is measured by the spectrophotometer 104. The absorbance of the transmitted light measured by the spectrophotometer 104 is transmitted to the operation portion 117 via an A/D convertor and an interface. Then, computation processing is performed by the operation portion 117 to calculate the concentrations of the prescribed components in such liquid samples as blood and urine, and the result is displayed on a display unit of the operation portion 117 and the like.

The system reagent container that contains the system reagent to be used in the washing process can be installed on or below an operation surface of the device. The system reagent is sent by a system reagent supply mechanism 200.

Figure 2:
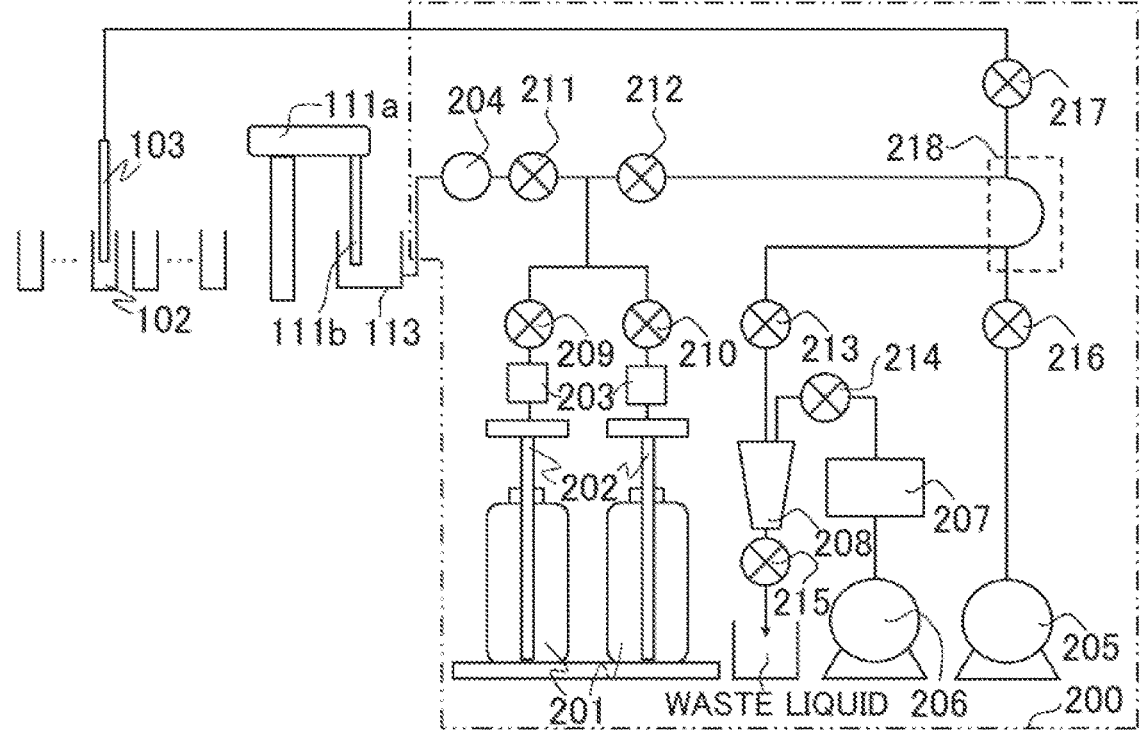
FIG. 2 is an outline view of a system reagent supply mechanism according to each embodiment.

FIG. 2 shows an entire outline view of the system reagent supply unit. The system reagent supply mechanism 200 includes system reagent containers 201, nozzles 202 for aspirating the reagent from the system reagent containers, bubble detectors 203, solenoid valves, a liquid sending mechanism, and a dilution unit, and supplies the system reagents necessary for each washing process. When the measurement is performed, an alkaline detergent is used as a system reagent to wash the reaction container and the sample dispensing probe. FIG. 2 shows the state where the system reagent containers 201 are set on a reagent installation unit. As illustrated FIG. 2, a plurality of the system reagent containers 201 can be installed on the installation plate, and the nozzles 202 of the liquid aspiration unit are inserted into the respective corresponding system reagent containers 201.

The system reagent containers 201 are connected to the washing mechanism 103 and the sample dispensing probe washing tank 113 via the bubble detector. When a plurality of the bottles are installed, for example, when two bottles are installed as shown in FIG. 2, there may be a configuration in which the bottle to be used is switched by controlling the solenoid valves 209, 210 in some cases. This is provided in order to allow the device to be continuously operated by switching the containers as a reagent supply source when the system reagent container becomes empty.

The supply mechanism of the reagent includes a liquid sending mechanism 204, a water supply pump 205, a vacuum pump 206, a vacuum tank 207, a vacuum bottle 208, and solenoid valves 209, 210, 211, 212, 213, 214, 215, 216, 217, and performs a liquid sending operation to the reaction container 102 and the sample dispensing probe washing tank 113. For example, the reagent is sent to the sample dispensing probe washing tank 113 by the operations of the liquid sending mechanism 204 and the solenoid valve 211. With respect to the reaction container 102, when the solenoid valves 212, 213, 214 are opened, the reagent is aspirated into a detergent dilution unit 218 by negative pressure of the vacuum bottle 208, and then the solenoid valves 212, 213, 214 are closed and the solenoid valves 216, 217 are opened, and thus the reagent that has been diluted with water is supplied by hydraulic pressure.

First Embodiment

First Embodiment is an embodiment of the configuration of the system reagent container installation unit of the system reagent supply unit of the automatic analyzer described above.

Figure 3A:
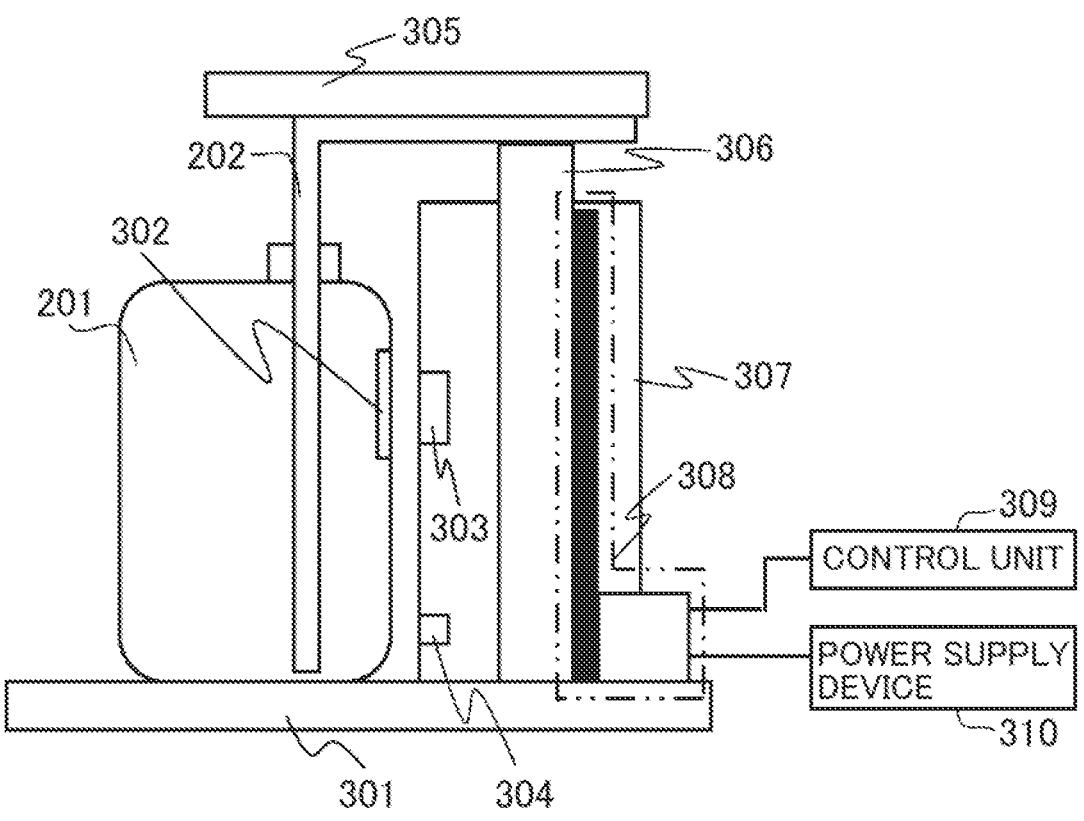
FIG. 3A is a diagram for showing a system reagent container installation unit and a state in which an aspiration nozzle is located at a reagent aspiration position according to a first embodiment.
Figure 3B:
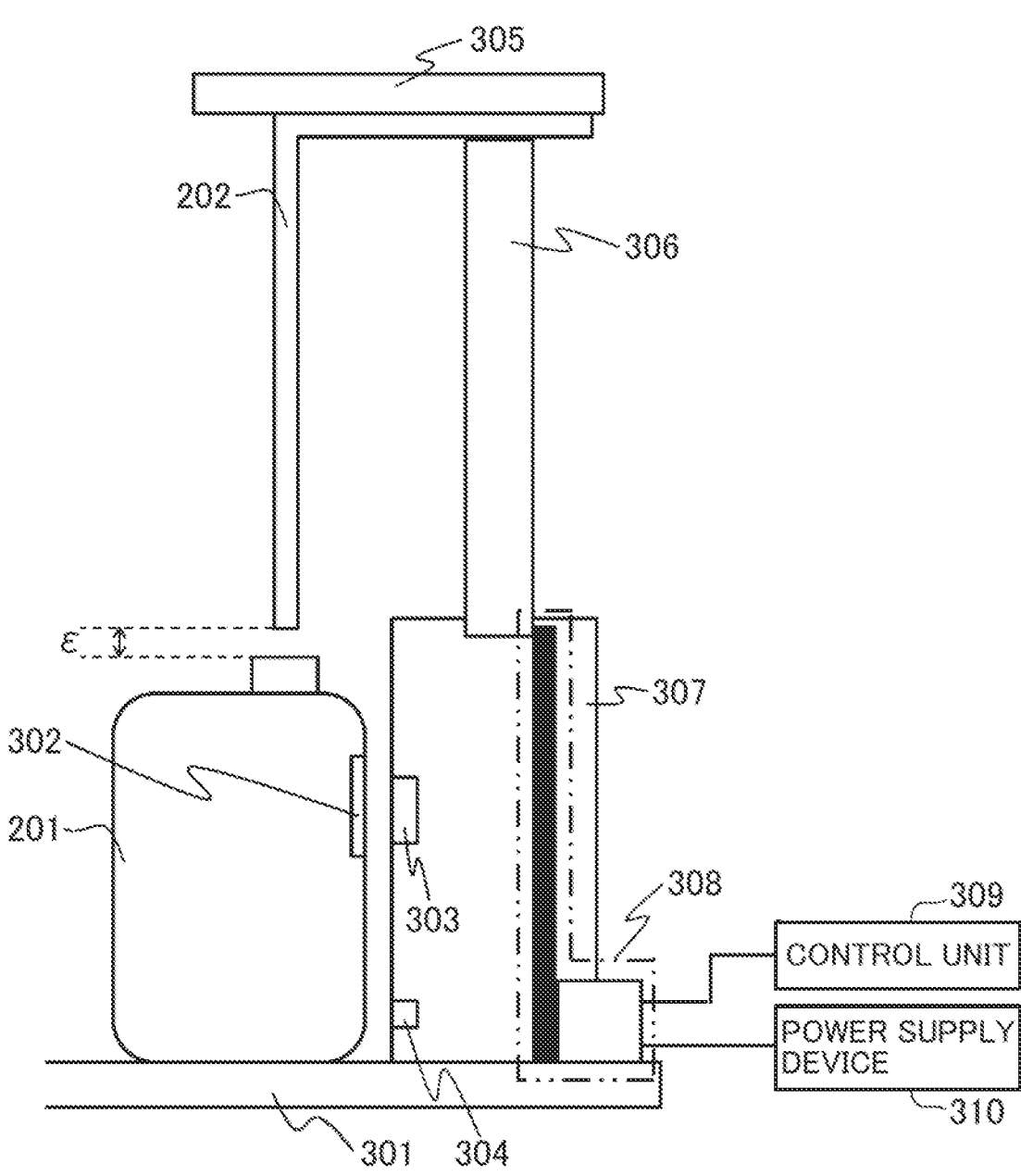
FIG. 3B is a diagram for showing the system reagent container installation unit and a state in which the aspiration nozzle is located at a reagent exchange position according to the first embodiment.
Figure 3C:
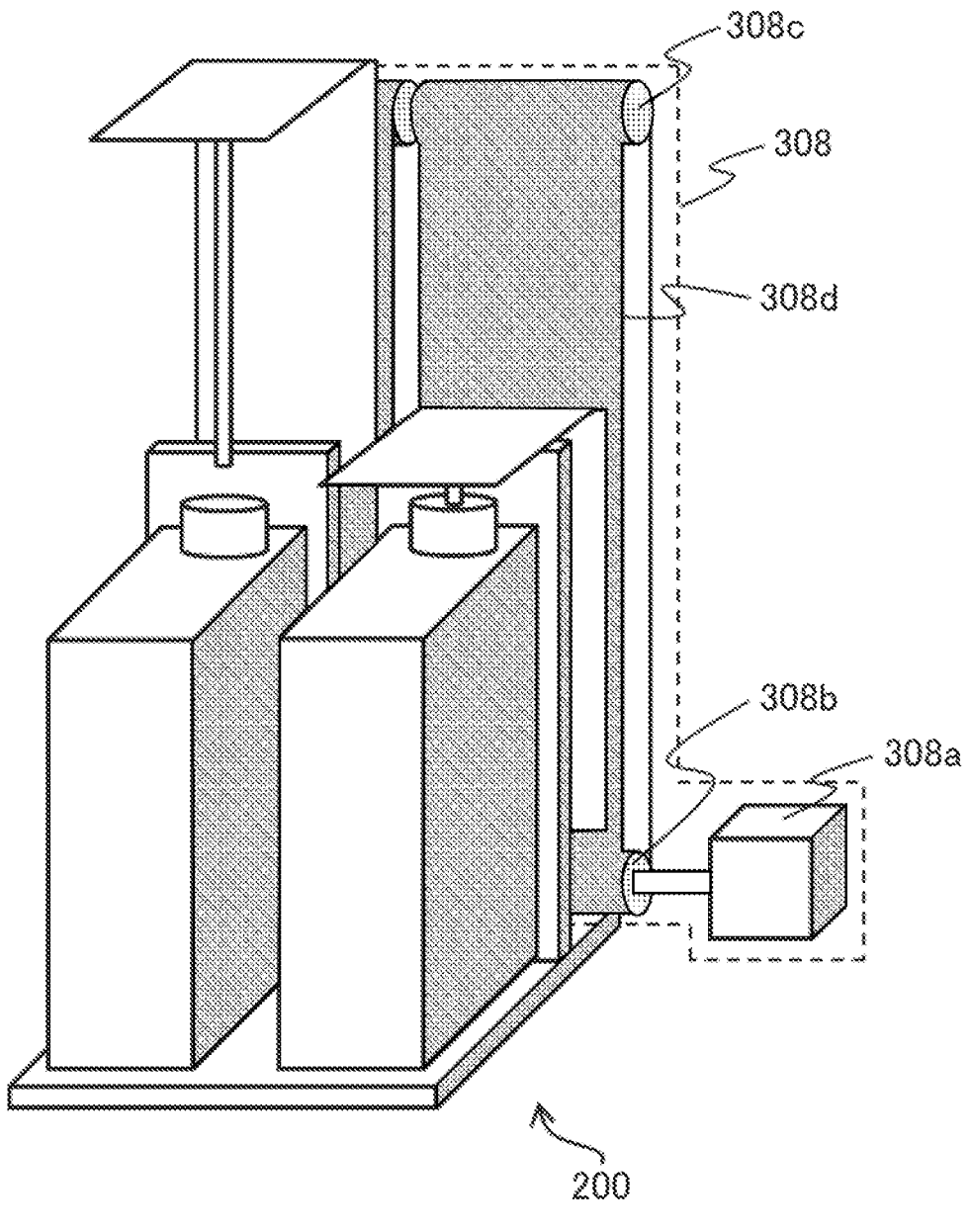
FIG. 3C is a bird's-eye view of the system reagent container installation unit according to the first embodiment.

With reference to FIG. 3A, FIG. 3B, and FIG. 3C, one configuration example of the system reagent container installation unit of the present embodiment will be described. The system reagent container installation unit includes an installation plate on which the system reagent container to be used in the device is installed, a liquid aspiration unit that aspirates a reagent from the system reagent container, a support unit to which the liquid aspiration unit is coupled and which can be moved between a reagent container exchange position and a reagent aspiration position, and a lift mechanism that allows the support unit to perform a lift operation.

In the system reagent container installation unit shown in FIG. 3A, a system reagent container stand 307 is disposed on a substrate 301 that constitutes the installation plate. The aspiration nozzle 202 is coupled to a handle 305 and a nozzle support unit 306 that can be raised and lowered from the system reagent container stand 307. A control unit 309 and a power supply device 310 are connected to the system reagent container installation unit, and electric power is supplied to a lift mechanism 308, an RFID reader/writer 303, and a liquid detector 304, which require electric power and control for the operations thereof. The power supply device 310 supplies electric power to the system reagent container installation unit when the analyzer receives power supply from the external power supply. The power supply device 310 cannot supply electric power to the system reagent container installation unit when the analyzer does not receive power supply from the external power supply. FIG. 3A shows a state in which the nozzle support unit 306 is housed in the reagent container stand 307. The control unit 309 and the power supply device 310 are corresponding to the operation portion 117 in FIG. 1. The liquid detector 304 is corresponding to each of the plurality of the system reagent containers, and the control unit 309 determines the residual amount in the system reagent container based on detection information obtained from each of the liquid detectors 304.

FIG. 3B shows a state in which the nozzle support unit 306 of the system reagent container installation unit of the present embodiment stops at a reagent exchange position. While the power supply of the device is turned on, when the liquid detector 304 determines that the residual liquid amount in the system reagent container 201 is small, the aspiration nozzle support unit 306 is lifted to the upper-limit point by the lift mechanism 308. This position is referred to as a system reagent exchange position. At this time, the aspiration nozzle support unit 306 is pulled up by the lift mechanism 308 as described above, and this allows the operator to remove the aspiration nozzle 202 from the system reagent container 201 without touching the handle 305 or the aspiration nozzle 202.

The aspiration nozzle 202 is preferably composed of a metal pipe that is fixed such that a nozzle tip position does not shift with respect to a placing position of the system reagent container 201. This avoids the reagent scattering around due to a shake of a tip of the aspiration nozzle 202 associated with the lift operation of the aspiration nozzle 202, which is assumed to happen when the aspiration nozzle 202 is a flexible resin pipe. On the other hand, an end portion of the aspiration nozzle 202 on the handle 305 side is connected to a pipe (not shown) to connect the aspiration nozzle 202 to the flow path of the device. Using a flexible resin pipe as the pipe connected to the end portion of the aspiration nozzle 202, the nozzle support unit 306 can be easily raised and lowered.

It is preferred that, in the state in which the nozzle support unit 306 is located at the system reagent exchange position, there is a predetermined distance e between the tip of the aspiration nozzle 202 and an opening portion of the system reagent container 201. This allows the operator to avoid hitting the system reagent container 201 with the tip of the aspiration nozzle 202, or eliminates the need to tilt the system reagent container 201 to place the system reagent container 201 on the reagent container installation unit when the operator exchanges the system reagent container 201. Thus, it is possible to reduce risks of a spillage of the reagent from the system reagent container 201, scattering of the reagent from the tip of the aspiration nozzle 202 and the like during the exchange.

FIG. 3C shows a schematic external view of the system reagent installation unit in a case where two system reagent containers are included. The lift mechanism 308 has a motor 308a, pulleys 308b, 308c, and a belt 308d that are joined that are joined to the nozzle support unit. The nozzle support unit can be moved in a vertical direction by driving the motor. The configuration of this lift mechanism is one example, and for example, the lift operation may be performed using a ball screw and a stage, or using a gear and a chain.

When the lift mechanism 308 is used, the nozzle support unit 306 is not lowered by its own weight because of the holding force of the driving portion of the lift mechanism 308 itself while the power supply of the device is turned on. On the other hand, under the condition where the power supply of the device is not turned on, the nozzle support unit 306 is possibly lowered by its own weight, and the lock mechanism is necessary in some cases.

FIG. 4 shows a configuration example of a lock mechanism 401 and a lock release mechanism 402 of the nozzle support unit of the present embodiment. The lock mechanism 401 includes a fixing-side base 501 and a movable-side base 502, and a spring 504 is provided between the fixing-side base 501 and the movable-side base 502. A bearing 503 is connected to a surface that faces a surface of the movable-side base 502 on which the spring 504 is provided. The lock release mechanism 402 includes a solenoid 511, and the solenoid 511 is connected to the movable-side base 502.

In the normal state of FIG. 4(a), the solenoid 511 is turned off, and the bearing 503 is in contact with a guide portion 306a of the nozzle support unit 306. At this time, since spring 504 is compressed, the bearing 503 is pressed against the guide portion 306a by an elastic force of the spring 504.

Figure 5A:
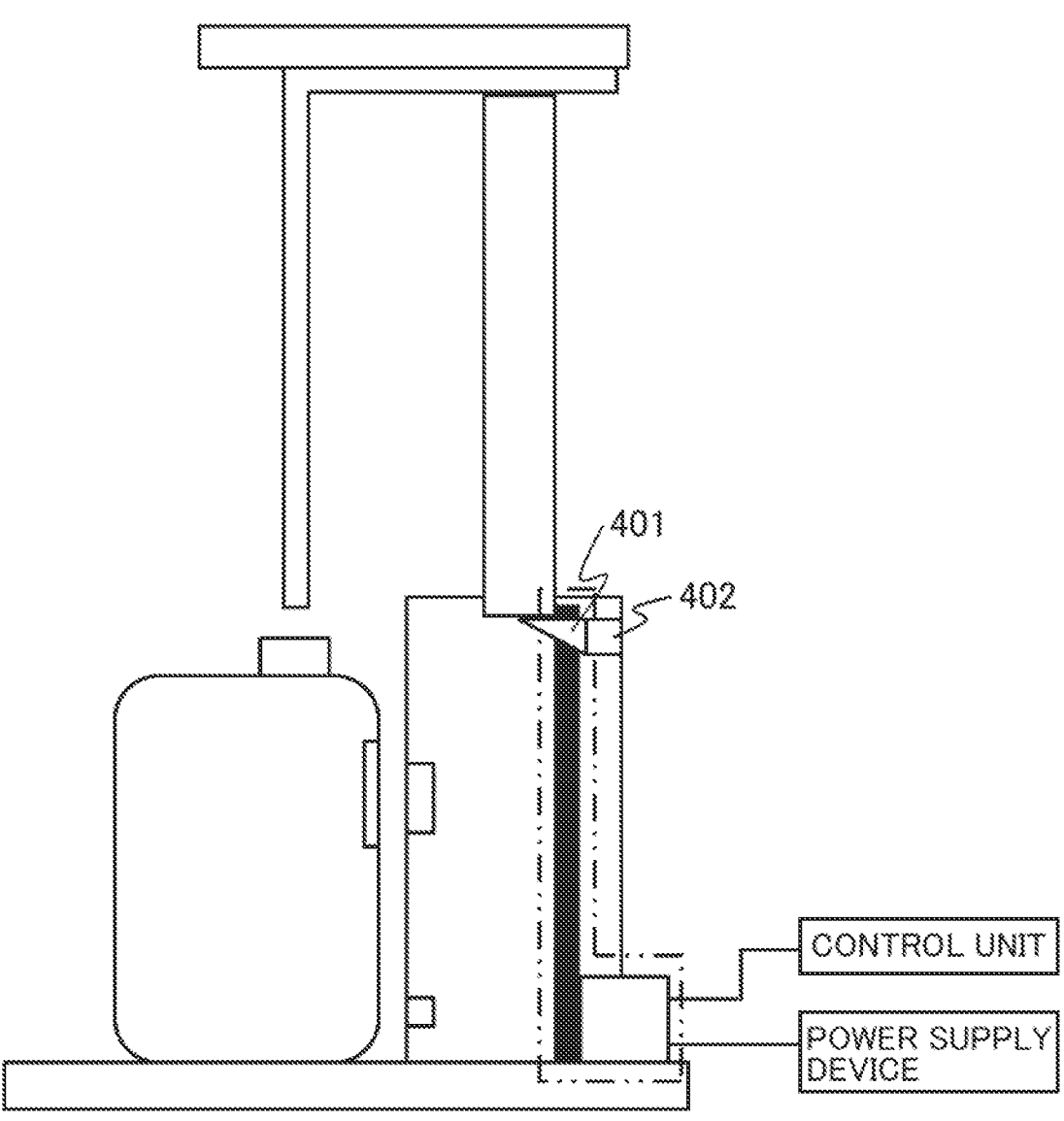
FIG. 5A is a diagram for showing a state in which a nozzle support unit is locked by the lock mechanism according to the first embodiment.

The reagent container installation unit in the lock state of FIG. 4(b) is in the state shown in FIG. 5A. Even in the lock state, the solenoid 511 is turned off. When the nozzle support unit 306 is lifted in a direction 521, the bearing 503 is fitted into a lock depressed portion 306b provided in the nozzle support unit 306. Thus, the nozzle support unit 306 is locked so as not to be lowered by its own weight. At this time, a length of the spring 504 is close to a natural length.

In this way, regardless of whether the power supply of the device is turned on or off, using the elastic force of the spring makes it possible to lift the nozzle support unit 306 to draw out the aspiration nozzle 202 from the system reagent container 201 and lock the nozzle support unit 306 in that state. Not only the spring but also an elastic body can be used, and the nozzle support unit 306 may be locked by another mechanical operation as long as electric power is not required for the operation thereof.

Figure 5B:
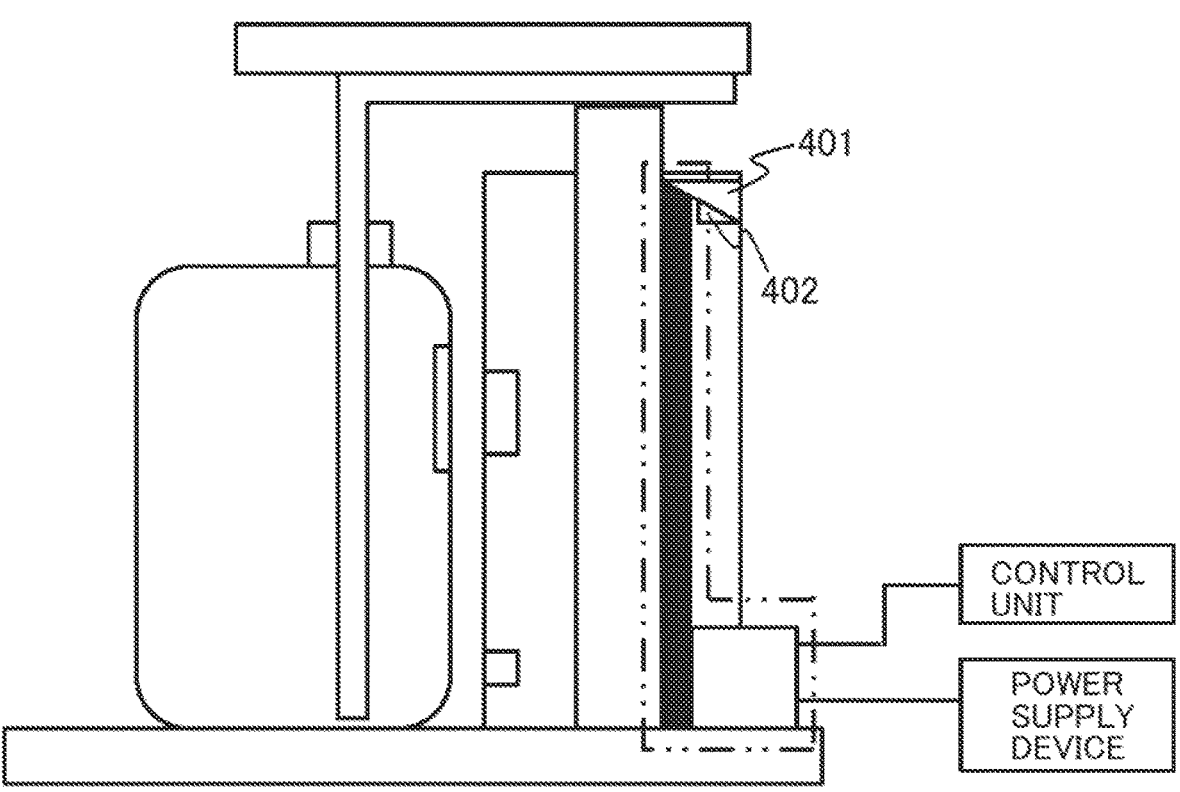
FIG. 5B is a diagram for showing a state in which the lock of the nozzle support unit is released by the lock release mechanism according to the first embodiment.

The reagent container installation unit in the lock release state of FIG. 4(c) is in the state shown in FIG. 5B. The solenoid 511 is turned on, and the bearing 503 and the movable-side base 502 are attracted in a direction 522. Accordingly, the bearing 503 is pulled out from the lock depressed portion 306b, and the nozzle support unit 306 is lowered in a direction 523. After a predetermined time, the solenoid 511 is turned off, and the bearing 503 comes into contact with the guide portion 306a of the nozzle support unit 306. When the nozzle support unit 306 is fully lowered, the reagent container installation unit returns to the normal state.

In order to operate the solenoid 511, it is necessary to supply electric power to the solenoid 511 and control the solenoid 511 to be turned on by the control unit 309. Accordingly, in order to release the lock of the nozzle support unit 306 and insert the aspiration nozzle 202 into the system reagent container, the power supply of the device needs to be turned on. As long as the lock release operation is controlled by the control unit 309, the lock release mechanism 402 may release the lock of the nozzle support unit 306 by another operation. For example, the lock may be released by pneumatic pressure that overcomes the elastic force of the spring.

Further, as shown in FIG. 3A, an RFID tag 302 is attached to the system reagent container 201. In the RFID tag 302, information related to the reagent, such as a type of the reagent, the remaining number of times the operation can be executed, an expiration date, and a lot number, is stored. In order to exchange information with the RFID tag 302, the system reagent container stand 307 is provided with the RFID reader/writer 303 at a position facing the system reagent container that is placed on the system reagent container stand 307. The system reagent container stand 307 is also provided with the liquid detector 304 that detects the presence of liquid at the placing position of the system reagent container. The liquid detector 304 includes, for example, a light source and a light receiving unit arranged such that the optical axis passes through the container. The detector detects the presence/absence of liquid based on the amount of light that is transmitted from the light source through the container and reaches the light receiving unit. When the amount of light transmitted through the container is equal to or greater than the specified value, it is determined that the residual amount is equal to or less than the specified residual amount. Thus, it is determined that the installed system reagent container is filled with the liquid. The RFID tag 302 and the RFID reader/writer 303 are examples, and it is sufficient that an information storage medium that stores information on the contained reagent is attached to the system reagent container 201, and that an information reader installed in the system reagent container installation unit can read the information on the contained reagent that is stored in the information storage medium.

That is, the automatic analyzer of the present embodiment includes an information reader such as the RFID reader/writer 303. The system reagent container is provided with an information storing device that includes information related to a reagent to be contained. The information reader reads the information related to the reagent contained in the system reagent container stored in the information medium in a state where the system reagent container is installed on the installation plate, and the control unit 309 determines whether or not the second condition is satisfied on the basis of the information read by the information reader.

Figure 6A:
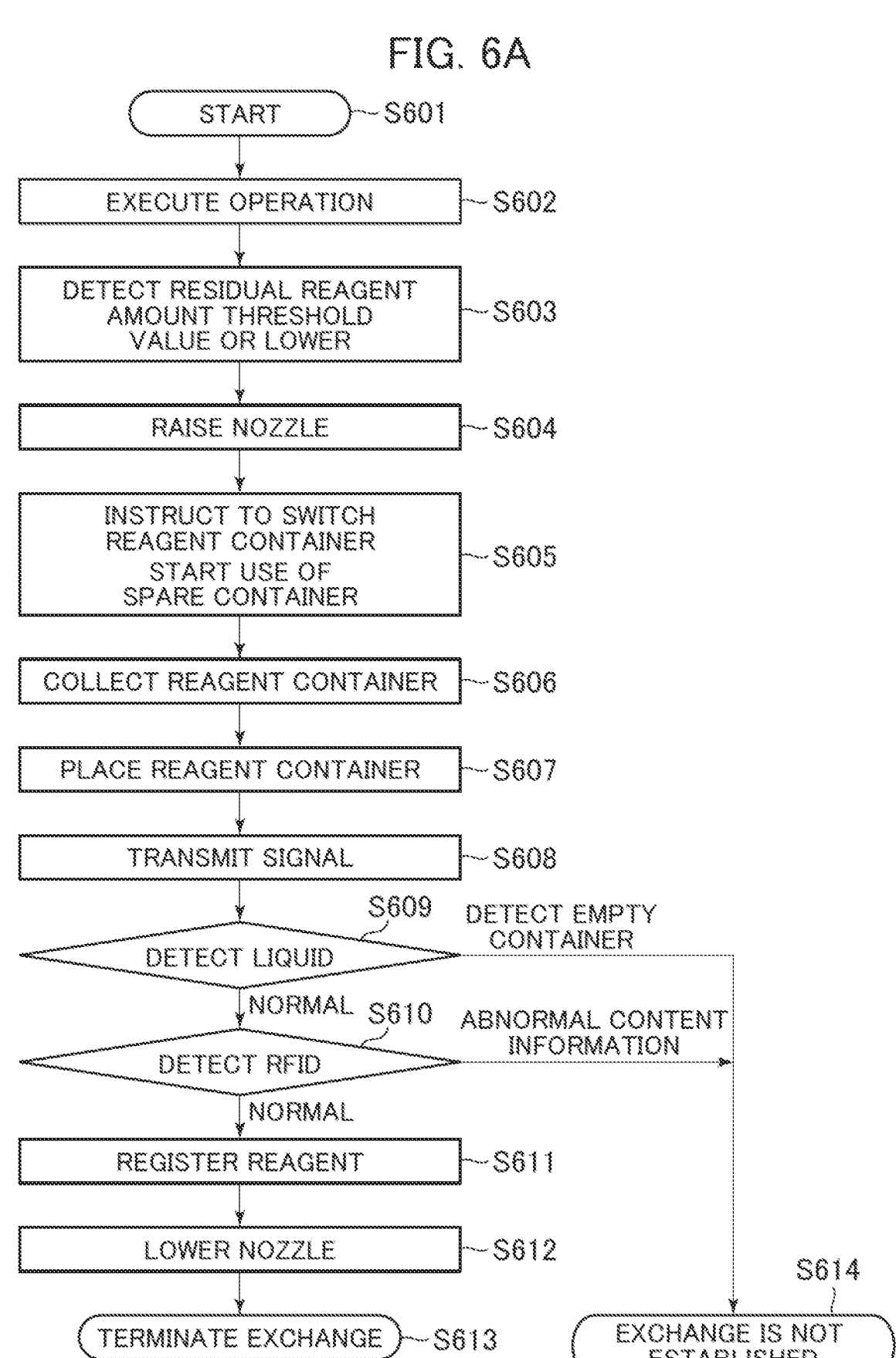
FIG. 6A is a diagram for showing an example of a reagent container exchange flow in a state where the power supply of the device is turned on according to the first embodiment.

Next, with reference to FIG. 6A, a system reagent container exchange flow in a state where the power supply of the device is turned on will be described. After the power supply is turned on (S601), an analysis operation is executed based on an analysis operation instruction that the operator input by the operation portion (S602). While the operation is being executed, as described above, when it is determined from detection information of the liquid detector 304 that the residual liquid in the system reagent container 201 in use has run out (S603), the nozzle support unit 306 is lifted by the lift mechanism 308 (S604) and stopped at the reagent exchange position. In the case where a plurality of the system reagent containers 201 are installed, the solenoid valves are controlled by a command from the control unit 309 at the start of the above-described nozzle raising operation, and the containers to be used are switched (S605). This keeps the system reagent being supplied, allowing the operation to be continued.

Next, the operator removes the system reagent container 201 from the installation unit (S606). Next, the operator places a new system reagent container 201 on the system reagent container installation unit (S607), and at this time, a signal that indicates the installation of the new system reagent container 201 is transmitted to the control unit 309 (S608). As a method of transmitting the signal, for example, a reflection type sensor, a weight sensor or the like (not shown) may be installed to transmit the signal based on detection information thereof, or the signal may be manually transmitted by the operator manually pressing a button or inputting from an operation screen. The liquid detector 304 detects the liquid in the new reagent container with the transmitted signal as a trigger (S609). That is, the automatic analyzer of the present embodiment includes a signal generator that generates a signal for activating the liquid detector 304.

When it is determined by the detection information of the liquid detector 304 that the system reagent container is filled with the liquid, the RFID reader/writer 303 starts reading the information in the RFID tag 302 on the system reagent container 201, with the detection (normal) of the liquid by the liquid detector 304 as a trigger (S610). Thus, by performing the detection by the RFID reader/writer 303 after the detection by the liquid detector 304, an unnecessary RFID reader/writer detection can be avoided.

The control unit 309 determines whether the RFID information is normal. Examples of determination contents include whether the type of reagent is a proper reagent that should be placed in the placing position, whether the residual liquid amount is sufficient, and whether the reagent has passed its expiration date. When the RFID information is normal, the control unit 309 registers the read RFID information (S611), and the lift mechanism 308 is operated to lower the aspiration nozzle 202 to the predetermined aspiration position in the system reagent container 201 (S612).

When it is determined by the detection information of the liquid detector 304 that the system reagent container 201 is not filled with the liquid, or when the RFID information is not normal, these facts are displayed on the display unit of the operation portion 117 (S614). This allows the operator to instantly recognize the installation error and install the correct system reagent container 201 before bringing the aspiration nozzle 202 into contact with a wrong reagent. In this way, the aspiration nozzle 202 contacts the normal reagent only, and thus contamination due to misplacement of the system reagent container 201 by the operator and the like can be avoided.

Using this flow allows the operator to exchange the reagent without touching the handle 305 or the nozzle support unit 306 during the exchange of the system reagent container 201, thus reducing the risk of contamination of the reagent or the like caused by accidentally touching the aspiration nozzle 202. The operator can exchange the reagent only by collecting and installing the system reagent container 201, thus the operation procedure is simplified and the burden on the operator is reduced.

Figure 6B:
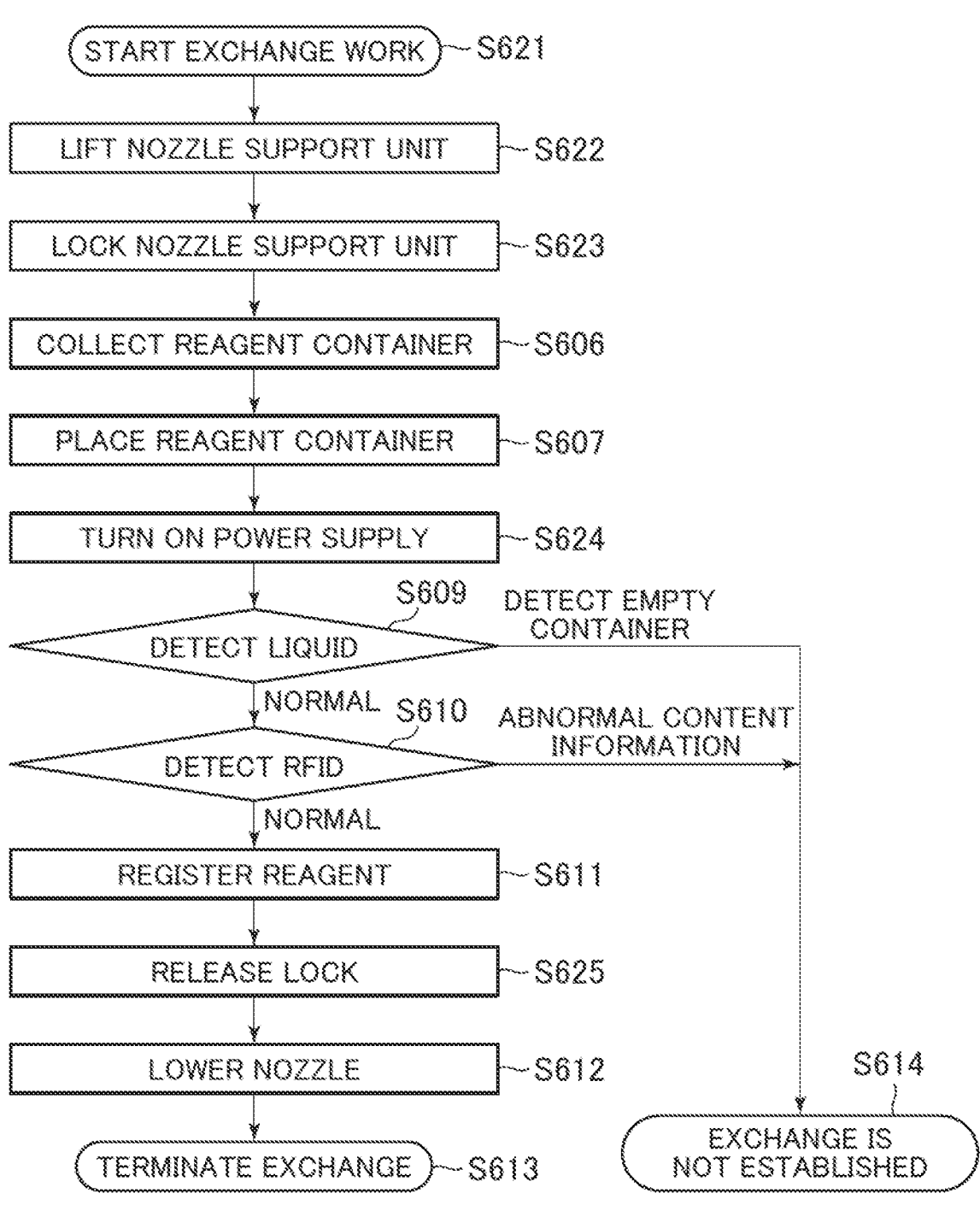
FIG. 6B is a diagram for showing an example of a reagent container exchange flow in a state where the power supply of the device is cut off according to the first embodiment.

Next, with reference to FIG. 6B, a reagent container exchange flow in a state where the power supply of the device is cut off will be described. Steps having the same contents as those in the exchange flow when the power supply is turned on are designated by the same reference numerals. Electric power is supplied to the system reagent container installation unit when the power supply is turned on, and electric power is not supplied to the reagent container installation unit when the power supply is cut off. Accordingly, the lift mechanism 308 does not operate either when the power supply is not turned on. When the power supply of the device is cut off, for example, to prepare for the case where the system reagent container needs to be removed from the installation unit because the residual liquid amount in the container is small or the maintenance is to be performed, the operator is allowed to remove the aspiration nozzle from the system reagent container without touching the aspiration nozzle by manually pulling up the handle 305.

The operator grips the handle 305 and lifts the nozzle support unit 306 (S622), and in a state in which the nozzle support unit 306 is locked (S623), the system reagent container 201 is exchanged (S606, S607). The lock mechanism 401 of the present embodiment can mechanically lock the nozzle support unit 306 without being supplied with electric power. When the operator turns on the power supply of the device (S624), as one of initialization processes of the device, the installation state of the system reagent container is confirmed by the detection information of the liquid detector 304 (S609). When it is determined that the system reagent container 201 filled with the reagent is installed, the RFID information is confirmed with the determination as a trigger (S610).

Confirming the installation state means confirming that the system reagent container is accurately installed in the system reagent installation unit. For example, the liquid detector 304 is a transmission type sensor that confirms the presence/absence of liquid in the system reagent container. If there is a liquid, the light from the light source of the liquid detector 304 is blocked by the liquid, and the presence of liquid can be recognized. In addition, it is possible to recognize that the system reagent container is installed in the correct position by recognizing the liquid. On the other hand, when the light from the light source of the transmission type sensor is not blocked, it is possible to recognize that there is no liquid or the system reagent container is not installed in the correct position. The installation state may be confirmed by using another detector besides the liquid detector 304 such that the presence/absence of liquid and the installation state of the system reagent container can be recognized separately.

When the RFID information is normal, the operation portion 117 registers the read RFID information (S611) and causes the lock release mechanism 402 to release the lock mechanism 401 (S625). After the lock is released, the lift mechanism operates and the nozzle is lowered to the aspiration position (S612). On the other hand, when the system reagent container filled with the reagent is not detected, or when the RFID information is not normal, the fact is displayed on the display unit of the operation portion 117 as an exchange not established (S614). In this case, since the power supply of the device has already been turned on, the process proceeds to step S604 in FIG. 6A and the reagent exchange process is executed. If the exchange terminates normally (S613), then, if necessary, a liquid replacement operation in the flow path, an analysis preparation operation and the like are automatically executed by the command from the operation portion 117.

According to the automatic analyzer of the present embodiment, in the exchange work of the system reagent container, it is possible to reduce the risk of contamination of the device, its surrounding area, and the like by reagents due to manual operation, and the risk of contamination of reagents by a nozzle contaminated by touching with a hand, as well as reduce the work burden of the operator.

Second Embodiment

Second Embodiment is another embodiment of the configuration of the system reagent container installation unit, with a safety function that stops the lift operation in consideration of the operator's safety if the operator inserts his/her hand or the like into the system reagent installation unit while the lift operation of the aspiration nozzle 202 is executed is added.

That is, it is the embodiment of the automatic analyzer that includes a lock mechanism that is fitted into the lift mechanism at plural stop positions in the case where power supply is stopped to lock the lift mechanism so as not to perform a lowering operation, and a lock release mechanism that can release the fitting of the lift mechanism and the lock mechanism in a state where power is supplied.

In the case where the power supply is turned off when the safety function is activated, since the power supply of the lift mechanism 308 is turned off, the aspiration nozzle 202 may be lowered by its own weight. Accordingly, the mechanism that can be locked at any position when the power supply is not turned on is required. In the lock mechanism described in First Embodiment, the fixing position is limited to the upper-limit point. Therefore, if the safety function is activated during the lift operation, there is a risk that the aspiration nozzle 202 is lowered by its own weight, causing scattering of a test solution or contact with an object that is not intended to contact. Accordingly, the mechanism that can be locked at any position when the power supply is not turned on is necessary in some cases.

For example, "when the safety function is activated" means the working timing of the detector that detects opening of the door disposed at a position where the system reagent container is housed during the operation of the device, or of the detector disposed at a position where a human hand is likely to touch the system reagent container and detects the human hand that is likely to accidentally touch the system reagent container. Note that, other means may be used. Such a detector is disposed in the device, and the power supply of the lift mechanism 308 is turned off with a detection by the detector as a trigger. Thus, a plurality of detectors for lock detection, which leads to power supply interruption, are installed in the automatic analyzer.

Figure 7A:
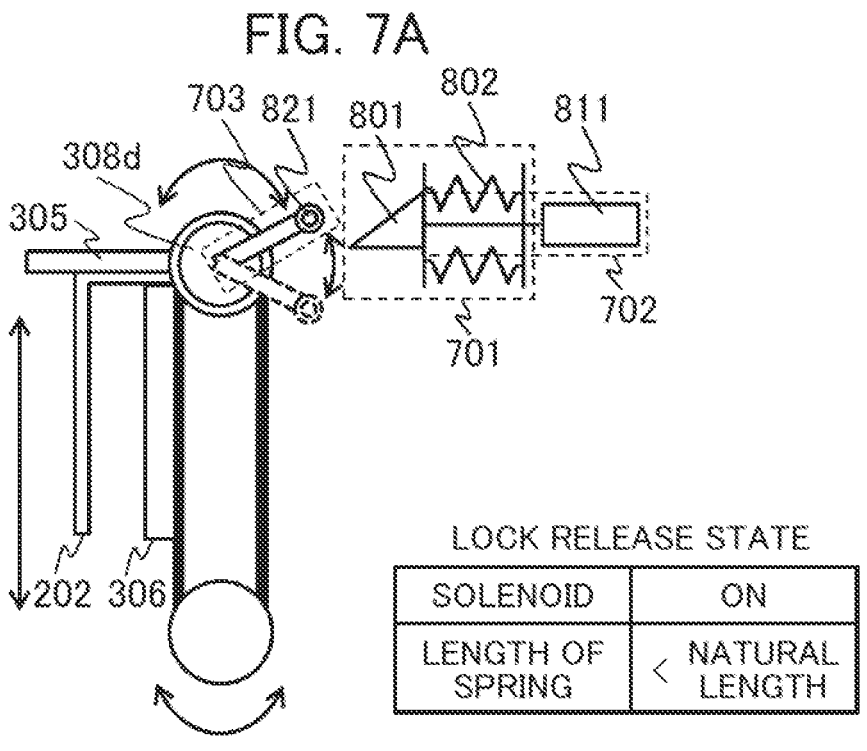
FIG. 7A is a diagram for showing a lock mechanism and a lock release mechanism and a state in which the lock of a nozzle support unit is released by the lock release mechanism according to a second embodiment.
Figure 7B:
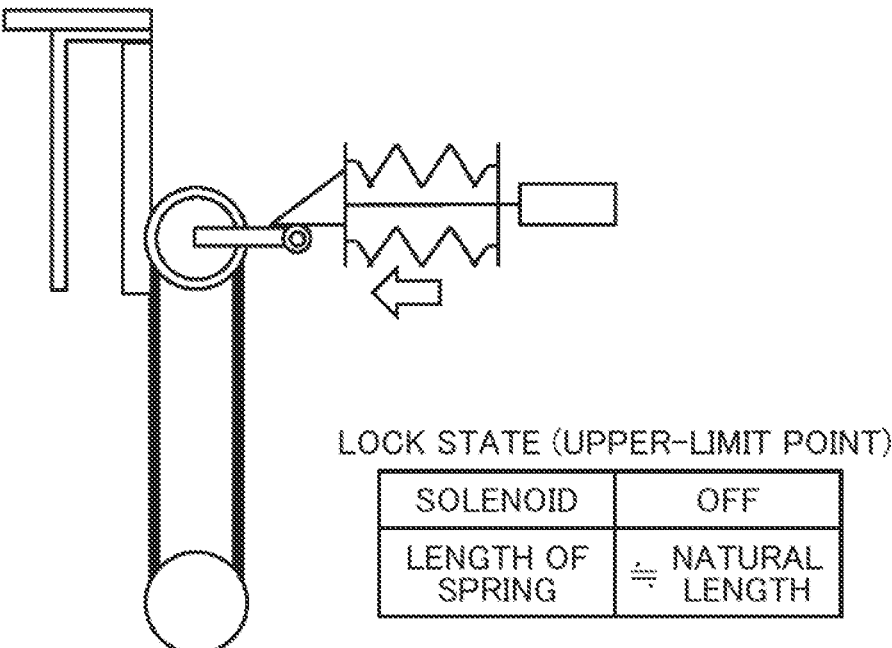
FIG. 7B is a diagram for showing the lock mechanism and the lock release mechanism and a state in which the nozzle support unit is locked at an upper-limit point by the lock mechanism according to the second embodiment.

FIGS. 7A and 7B are diagrams for showing a configuration example of a lock mechanism 701 and a lock release mechanism 702 according to the present embodiment. The lock mechanism 701 includes a fixing-side base and a movable-side base, and a spring is provided between the fixing-side base and the movable-side base. A stopper-b 703 is connected to a pulley 308d of the lift mechanism. A bearing 821 is connected to the distal end of the stopper-b 703. For the rotation of the lift mechanism, for example, a ball screw and the like may be used in addition to the structure using the pulley as shown here. The similar function can be configured in this case as well.

(a) The reagent container installation unit in the lock release state is in the state shown in FIG. 7A. A solenoid is turned on, and a stopper-a 801 and the movable-side base are attracted to a solenoid side. This causes the stopper-a 801 to be pulled out and the nozzle support unit 306 can be lowered.

In order to operate the solenoid, it is necessary to supply electric power to the solenoid and control the solenoid to be turned on by the control unit. Accordingly, in order to release the lock of the nozzle support unit and insert the aspiration nozzle 202 into the reagent container, the power supply of the device needs to be turned on. As long as the lock release operation is controlled by the control unit, the lock release mechanism 702 may release the lock of the nozzle support unit 306 by another operation. For example, the lock may be released by pneumatic pressure that overcomes the elastic force of the spring.

(b) The reagent container installation unit in the state being locked at the upper-limit point is in the state shown in FIG. 7B. Since the lock is activated when the power supply of the device and the power supply of the lift mechanism are turned off, the solenoid is also turned off. At this time, the stopper-a 801 and the movable-side base are extended to the lift mechanism 308 side by a tensile force of the spring. The stopper-a 801 that has been extended is fitted into the stopper-b 703. Thus, the nozzle support unit 306 is not lowered by its own weight even when the power supply of the lift mechanism 308 is turned off. At this time, a length of the spring is close to a natural length.

Figure 8C:
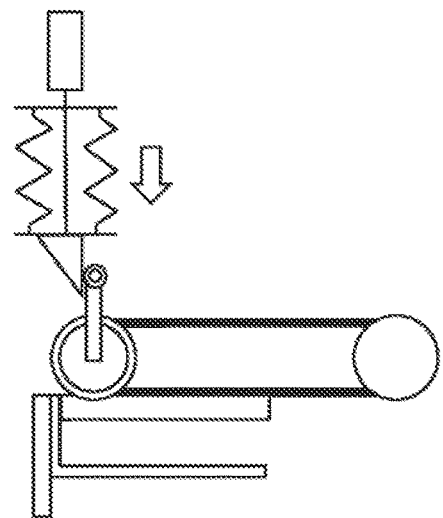
FIGS. 8A to 8C are diagrams for showing the lock mechanism and the lock release mechanism and a state in which the nozzle support unit is locked at a point other than the upper-limit point by the lock mechanism according to the second embodiment.
Figure 8B:
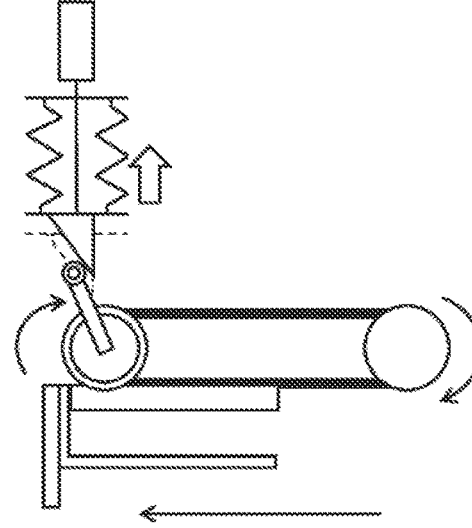
Figure 8A:
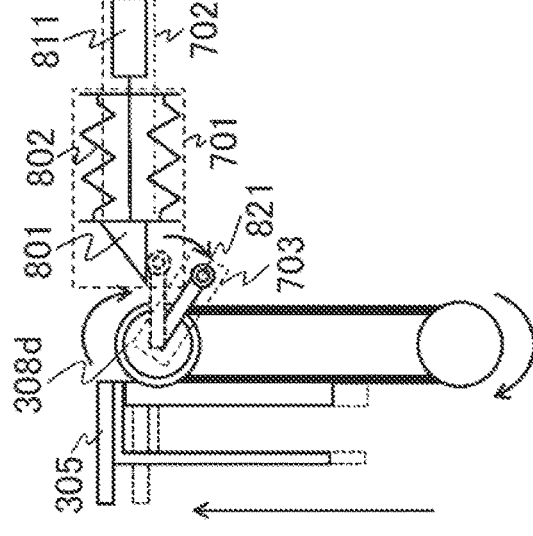

(c) The reagent container installation unit in the state being locked at the point other than the upper-limit point is in the state shown in FIG. 8A. In this case, similarly to the above-described (b), the stopper-a 801 is extended. When the aspiration nozzle 202 attempts to move in a lowering direction, the aspiration nozzle 202 cannot be lowered because the stopper-a 801 is fitted into the stopper-b 703. On the other hand, when the aspiration nozzle 202 attempts to move in a raising direction, as shown in FIG. 8B, the bearing 821 of the stopper-b 703 contacts and pushes the inclined surface of the stopper-a 801, thus contracting the lock mechanism 701. After the rotation, as shown in FIG. 8C, the lock mechanism 701 is extended again by the elastic force of a spring 802 and locked.

This mechanism of the present embodiment allows the aspiration nozzle 202 to avoid lowering by its own weight at any height. Further, a aspiration nozzle can be nozzle can be raised manually. When the power supply is not turned on and it is desired to manually raise the aspiration nozzle, the aspiration nozzle can be removed from the system reagent container without being touched by manually pulling up the handle.

The present invention is not limited to the above-described embodiments, and further includes various modifications. For example, the above-described embodiments have been described in detail in order to facilitate the understanding of the present invention, and the present invention is not necessarily limited to those including all of the described configurations.

LIST OF REFERENCE SIGNS 200 system reagent supply mechanism
201 system reagent container
202 nozzle
301 substrate
302 RFID tag
303 RFID reader/writer
304 liquid detector
305 handle
306 nozzle support unit
307 system reagent container stand
308 lift mechanism
309 control unit
310 power supply device
401 lock mechanism
402 lock release mechanism
501 fixing-side base
502 movable-side base
503 bearing
504 spring

The invention claimed is:

1. An automatic analyzer comprising:
an installation plate on which a plurality of system reagent containers is installed;
a liquid aspiration unit configured to aspirate a reagent from each of the plurality of system reagent containers and dispense the reagent into a reaction container;
a support unit to which the liquid aspiration unit is coupled and which is movable between a reagent container exchange position, which is a highest possible position to which the support unit is movable and at which the liquid aspiration unit is removable, and a reagent aspiration position, which is a position at which the reagent is aspiratable from each of the plurality of system reagent containers;
a lift mechanism configured to lift the support unit upward to the reagent container exchange position and configured to lower the support unit to the reagent aspiration position;
a control unit coupled to the lift mechanism, the support unit and the liquid aspiration unit, configured to control the lift mechanism so that the support unit is raised to the reagent container exchange position based on a determination that a residual liquid amount in the plurality of system reagent containers installed on the installation plate is equal to or smaller than a specified value and the support unit is lowered to the reagent aspiration position based on a determination that contents of the plurality of system reagent containers installed on the installation plate are normal, which is determined by at least one of reagent type, the residual liquid amount, and reagent expiration date, and are installed at predetermined positions, and configured to analyze a mixed solution of the reagent and a sample disposed in the reaction container;
a lock mechanism configured to fit into a stopper, which includes a plurality of stop positions and is attached to the lift mechanism, to lock the lift mechanism so as prevent a lowering of the liquid aspiration unit based on a weight of the liquid aspiration unit acting on the support unit in a state in which power is not supplied to the automatic analyzer; and
a lock release mechanism configured to release the lock mechanism from the plurality of stop positions of the stopper based on control by the control unit in a state in which power is supplied to the automatic analyzer.

2. The automatic analyzer according to claim 1, further comprising:
a liquid detector corresponding to each of the plurality of system reagent containers,
wherein the control unit determines the residual liquid amount in each of the plurality of system reagent containers based on detection information obtained from the liquid detector of each of the plurality of system reagent containers.

3. The automatic analyzer according to claim 1, further comprising:
an information reader, and
an information storing device disposed in each of the plurality of system reagent containers and configured to store reagent information describing the reagent contained in each of the plurality of system reagent containers,
wherein the information reader is configured to read the reagent information stored in the information storing device, and
wherein the control unit is configured to determine whether or not the contents of the plurality of system reagent containers installed on the installation plate are normal and are installed at the predetermined positions based on the reagent information read by the information reader.

4. The automatic analyzer according to claim 1, further comprising:
a liquid detector corresponding to each of the plurality of system reagent containers,
wherein the control unit is configured to determine an installation state of each of the plurality of system reagent containers with the liquid contained based on an output of the liquid detector and determine whether or not the contents of the plurality of system reagent containers installed on the installation plate are normal and are installed at the predetermined positions.

5. The automatic analyzer according to claim 2,
wherein the control unit is configured to start reading of the information of the plurality of system reagent containers after the residual liquid amount in each of the plurality of system reagent containers is determined based on the detection information of the liquid detector.

* * * * *